(12) United States Patent
Yang

(10) Patent No.: US 10,418,000 B2
(45) Date of Patent: Sep. 17, 2019

(54) METHOD AND APPARATUS FOR SCREEN CAPTURE ON A DISPLAY DEVICE

(71) Applicant: Alibaba Group Holding Limited, George Town, Grand Cayman (KY)

(72) Inventor: Jirong Yang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 446 days.

(21) Appl. No.: 14/920,731

(22) Filed: Oct. 22, 2015

(65) Prior Publication Data

US 2016/0118025 A1    Apr. 28, 2016

(30) Foreign Application Priority Data

Oct. 22, 2014  (CN) .......................... 2014 1 0567512

(51) Int. Cl.
*G09G 5/393* (2006.01)
*G06T 1/60* (2006.01)
*G06T 9/00* (2006.01)
*G06T 1/20* (2006.01)
*G09G 5/395* (2006.01)
*H04N 19/91* (2014.01)

(52) U.S. Cl.
CPC ............... *G09G 5/393* (2013.01); *G06T 1/20* (2013.01); *G06T 1/60* (2013.01); *G06T 9/00* (2013.01); *G09G 5/395* (2013.01); *G09G 2340/02* (2013.01); *G09G 2360/127* (2013.01); *G09G 2360/18* (2013.01); *G09G 2370/04* (2013.01); *G09G 2370/042* (2013.01); *H04N 19/91* (2014.11)

(58) Field of Classification Search
None
See application file for complete search history.

(56) References Cited

U.S. PATENT DOCUMENTS

| 8,701,001 | B2 | 4/2014 | Dovey et al. |
| 8,736,875 | B2 | 5/2014 | Groves |
| 8,739,044 | B1 | 5/2014 | Varadarajan |
| 8,780,125 | B2 | 7/2014 | Tankleff et al. |
| 8,797,335 | B2 | 8/2014 | Muir |
| 8,797,338 | B2 | 8/2014 | Muir |
| 8,798,598 | B2 | 8/2014 | Rossmann |
| 8,826,116 | B2 | 9/2014 | Martin et al. |
| 8,826,452 | B1 | 9/2014 | He et al. |
| 8,836,798 | B2 | 9/2014 | Hii |
| 8,861,924 | B2 | 10/2014 | Meads et al. |

(Continued)

*Primary Examiner* — Joni Richer

(57) ABSTRACT

An apparatus and method for performing screen captures on display devices are disclosed herein. The method includes receiving a screen capture command, determining pixel values of rows of the display device based on the screen parameters, obtaining framebuffer parameters from a framebuffer of the display device, the framebuffer parameters comprising pixel values of rows of the framebuffer, determining whether pixel values of the rows of the framebuffer are substantially equivalent to the pixel values of the rows of the display device, processing screenshot data read from the framebuffer based on the pixel values of the rows of the screen when the pixel values of the rows of the framebuffer are not substantially equivalent to the pixel values of the rows of the screen, and creating a file comprising the screenshot.

20 Claims, 5 Drawing Sheets

(56) References Cited

U.S. PATENT DOCUMENTS

| | | |
|---|---|---|
| 8,891,939 B2 | 11/2014 | Alexandrov et al. |
| 8,924,884 B2 | 12/2014 | Bank et al. |
| 8,935,652 B2 | 1/2015 | Mazzoleni et al. |
| 8,935,653 B2 | 1/2015 | Mazzoleni et al. |
| 8,972,454 B2 | 3/2015 | Beardsmore et al. |
| 9,057,931 B1 | 6/2015 | Baldwin |
| 9,123,106 B2 | 9/2015 | Homme et al. |
| 9,161,006 B1 | 10/2015 | Wang et al. |
| 9,185,175 B1 | 11/2015 | Sharma et al. |
| 9,213,989 B2 | 12/2015 | Davies |
| 9,215,266 B2 | 12/2015 | Kridlo |
| 9,239,910 B2 | 1/2016 | Kim et al. |
| 9,247,151 B2 | 1/2016 | Rolston |
| 2004/0017939 A1 | 1/2004 | Mehrotra |
| 2004/0222995 A1 | 11/2004 | Colle |
| 2006/0056686 A1* | 3/2006 | Gotz ................ G06F 17/30899 382/166 |
| 2007/0222791 A1 | 9/2007 | Graves et al. |
| 2010/0309217 A1 | 12/2010 | Greenebaum |
| 2013/0031149 A1* | 1/2013 | Kern ....................... H04L 67/06 707/827 |
| 2013/0088425 A1* | 4/2013 | Yun ....................... G06F 3/0321 345/156 |
| 2013/0147860 A1* | 6/2013 | Ishida ....................... G09G 5/10 345/690 |
| 2015/0035993 A1* | 2/2015 | James ..................... H04N 17/04 348/189 |
| 2017/0192797 A1* | 7/2017 | Snir ....................... G06F 9/4443 |

* cited by examiner

METHOD AND APPARATUS FOR SCREEN CAPTURE ON A DISPLAY DEVICE

CROSS REFERENCE TO RELATED APPLICATION

The present application claims priority to Chinese Patent Application No. 201410567512.6, filed on Oct. 22, 2014, naming the same inventors as in the present application. The contents of the above referenced application are incorporated by reference, the same as if fully set forth herein.

FIELD

The present invention relates generally to the field of the screen capture technology. More specifically, the present invention is related to methods and apparatus for enabling screen capture on display devices.

BACKGROUND

With the development of the smart terminal technology, people oftentimes utilize smart terminals for activities such as work, school, entertainment and the like. For example, by use of a smart terminal, a user can browse documents, emails, video, etc., the content of which usually is displayed for the end user at the display of the smart terminal. During the browsing of such content, the user often wishes to save the information displayed on the display for purposes of record or sharing such information. In order to realize such functionality, the current technologies provide for multiple approaches for screen capture. Those approaches save the information displayed on a display in the form of images of screen capture such that it is convenient for the user to store the information displayed on the display.

One of the screen capture approaches by the Android systems reads image data displayed on a display device from the framebuffer when capturing the screenshot. A new file is used to store the screenshot in accordance with the image data such that to achieve the saving of the information displayed at the display upon screen capture.

A framebuffer is a mechanism in a display buffer that performs functions similar to a graphics card. In other words, the hardware structure of a graphics card is abstracted or mimicked by a framebuffer. The video memory is accessed by reading from and writing to the framebuffer. A user may consider the framebuffer as a memory mapping for the display memory. After the display memory is mapped into a process address space, the framebuffer can be read from and written to directly, and the writing can be reflected immediately on the display device. Therefore, in theory, a screenshot of the display device can be obtained by reading image data from the framebuffer to capture the screen image displayed on the display device.

However, methods of performing a screen capture utilizing a framebuffer sometimes produces corrupt or discolored images which do not display the information displayed at the display device, causing the user not able to save the display screen information. Further, such methods also sometimes produce images with distorted colors, e.g., red screen or blue screen, etc., which similarly do not display the information displayed at the display device, causing the user not able to save the display screen information.

Therefore, because current screen capture methods utilizing a framebuffer often leads to distorted images which do not display the information displayed at the display device upon screen capture such that the users cannot accurately save the information displayed at the display device, great inconvenience is caused for the users.

SUMMARY OF THE DISCLOSURE

Embodiments of the present disclosure describe a method and apparatus for performing a screen capture on a display device that does not produce unrecognizable images of display screen information.

According to one embodiment of the present disclosure, a method for performing screen captures on display devices is disclosed. The method includes receiving a screen capture command, obtaining screen parameters of the display device, obtaining framebuffer parameters from a framebuffer of the display device, the framebuffer parameters comprising pixel values of rows of the framebuffer, determining whether pixel values of the rows of the framebuffer are substantially equivalent to the pixel values of the rows of the display device, processing screenshot data read from the framebuffer based on the pixel values of the rows of the screen when the pixel values of the rows of the framebuffer are not substantially equivalent to the pixel values of the rows of the screen, and creating a file comprising the screenshot.

Alternatively, according to some embodiments, the screen parameters include a distribution order of RGB channels of the display device.

Alternatively, according to some embodiments, the framebuffer parameters include a distribution order of RGB channels of the framebuffer Alternatively, according to some embodiments, the method further includes determining whether the distribution order of the RGB channels of the display device is substantially equal to the distribution order of the RGB channels of the framebuffer, and when the distribution order of RGB channels of the display device is different from the distribution order of RGB channels of the framebuffer, adjusting RGB value order of the screenshot data in accordance with the distribution order of the RGB channel of the display device.

Alternatively, according to some embodiments, the file is created based on the processed screenshot data.

Alternatively, according to some embodiments, the method further includes converting the processed screenshot data to a different format in accordance with a format required by a compression algorithm to create an intermediate image, creating a second file including the intermediate image, and compressing the second file using the compression algorithm, where the compressed file comprises the screenshot data.

Alternatively, according to some embodiments, the compression algorithm is a Huffman coding algorithm.

Alternatively, according to some embodiments, the method further includes determining pixel values of rows of the display device based on the screen parameters.

Alternatively, according to some embodiments, the screen parameters include a screen resolution and the pixel values of rows of the display device are determined based on the screen resolution.

According to another embodiment of the present disclosure, an apparatus for creating a screen capture of a rendered image is disclosed. The apparatus includes a display screen configured to display image data, a framebuffer configured to store the image data to be presented on the display screen, and a processor coupled to the display screen and the framebuffer that receives a screen capture command, obtains framebuffer parameters comprising pixel values of rows of the framebuffer, reads the pixel values of the rows of the framebuffer provided by the processor, reads pixel values of the rows of the screen provided by the processor, determines if the pixel values of the rows of the framebuffer are substantially equivalent to the pixel values of the rows of the screen, and processes the image data from the framebuffer based on the pixel values of the rows of the display screen when the pixel values of rows of the framebuffer are not substantially equivalent to the pixel values of rows of the screen.

Alternatively, according to some embodiments, the screen parameters include a distribution order of RGB channels of the display device, and the framebuffer parameters include a distribution order of RGB channels of the framebuffer.

Alternatively, according to some embodiments, the processor reads the distribution order of the RGB channels of the framebuffer, reads the distribution order of the RGB channels of the screen, determines if the distribution order of the RGB channels of the framebuffer are substantially equivalent to the distribution order of the RGB channels of the display device, and adjusts RGB value order of the screenshot data in accordance with the distribution order of the RGB channels of the screen when the distribution order of the RGB channels of the framebuffer is not substantially equivalent to the distribution order of the RGB channels of the screen.

Alternatively, according to some embodiments, a file comprising the screenshot is created in accordance with the processed image data.

Alternatively, according to some embodiments, the processor converts a format of the processed image data in accordance with a required format of a compression algorithm to create an intermediate image, creates a second file comprising the intermediate image, and compresses the second file using the compression algorithm, wherein the compressed file comprises the image data.

Alternatively, according to some embodiments, the compression algorithm includes a Huffman coding algorithm.

Alternatively, according to some embodiments, the pixel values of the rows are obtained based on the screen parameters.

Alternatively, according to some embodiments, the processor obtains screen parameters, wherein the screen parameters comprise a screen resolution, and determines the pixel values of the rows of the screen based on the screen resolution.

According to yet another embodiment of the present disclosure, a method for performing a screen capture of a display device is disclosed. The method includes receiving a screen capture command, obtaining a distribution order of RGB channels of the display device, obtaining framebuffer parameters comprising a distribution order of RGB channels of a framebuffer, determining whether the distribution order of the RGB channels of the framebuffer is substantially equivalent to the distribution order of the RGB channels of the display device, adjusting a distribution order of the RGB channels of screenshot data read from the framebuffer based on the distribution order of the RGB channels of the display device when the distribution order of the RGB channels of the framebuffer is not substantially equivalent to the distribution order of the RGB channels of the display device, where the screenshot data comprises image data displayed the display device when the screen capture command is received, and creating a file comprising the adjusted screenshot data.

Comparing to the current technologies, the present disclosure, by use of the comparing of the pixel values of rows of the framebuffer and the pixel vales for the rows of the display device, and the corresponding processing of the data of the image of screen capture, provides for the prevention of image pixel disorder, and the prevention of corrupt or discolored images, ensuring the users being able to accurately save the information displayed at the display device.

Further, the present disclosure, by use of comparing the distribution order of the RGB channels of the framebuffer and the display device, and the corresponding processing the data of the image of screen capture, provides for the prevention of image RGB distribution channel disorder, and the prevention of images of distorted colors, e.g., red screen, blue screen, etc.

This summary contains, by necessity, simplifications, generalizations and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

Embodiments of the present disclosure will be better understood from a reading of the following detailed description, taken in conjunction with the accompanying figures in which like reference characters designate like elements and in which.

DETAILED DESCRIPTION

Figure 1:
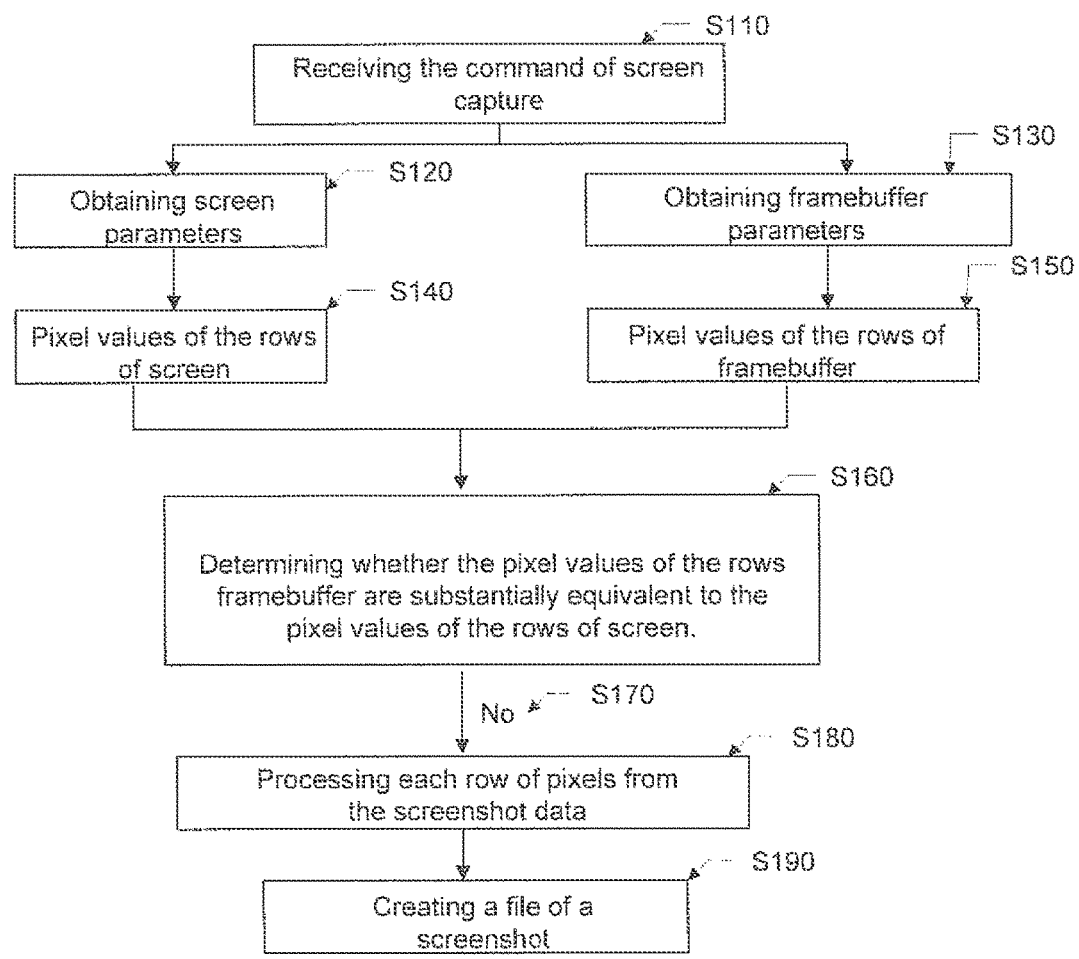
FIG. 1 is a flow chart depicting an exemplary screen capture process for an exemplary display device according to embodiments of the present disclosure.

FIG. 1 depicts an exemplar) sequence of computer-implemented steps for performing a screen capture process on a display device according to embodiments of the present invention. At step S110, a screen capture command initiating a screen capture of an image displayed on the display device is received. There are multiple ways of initiating the of the screen capture command. According to some embodiments, a user presses a physical button on the display device to initiate a of the screen capture. The button may be a single physical button or a combination of several physical buttons, for example. According to another embodiment a user presses a screenshot button on a touch-sensitive display interface to initiate a of the screen capture. In still other embodiments, a user initiates the screen capture by shaking the device or performing another predefined gesture or action for purposes of saving the displayed information the user intend to.

In step S120, screen parameters comprising pixel values of the rows of the display screen are obtained. The pixel values of the rows of screen S140 indicate the number of the pixels in each row. For example, if a pixel value of a row is 1024, the number of the pixels in the row is 1024. The screen parameters may further include screen resolution, a distribution order of the RGB channels, pixel aspect ratio, display screen aspect ratio and brightness of the screen. The screen parameters may be adjusted to set a display mode of the display device. In this embodiment, in order to determine the row pixel values of the framebuffer and the row pixel values of the display device such that to process the image data of the screen capture based on the row pixel values, the row pixel values of the display screen is first obtained. The row pixel values of the display device can be obtained based on the obtained screen parameters. The screen parameters may be obtained by using a function for reading the screen parameters provided by the system.

In this embodiment, the obtaining of the screen parameters and the obtaining of the row pixel values of the display device based on the obtained screen parameters can be implemented in the following steps. First, the screen parameters are obtained, the parameters including screen resolution. Then, based on the screen resolution, the row pixel values are obtained. For example, in an Android system, screen resolution is obtained using a function provided by the system that returns screen parameters. After the screen parameters are obtained, the pixel values of the rows of the screen are determined.

In step S130, framebuffer parameters are obtained comprising pixel values of the rows of a framebuffer S150. In order to determine whether the values of the pixels of the rows of the framebuffer and the display device are equal, the pixel values of the framebuffers are obtained first, the pixel values of the rows of the framebuffer being the number of the pixels in each row of the framebuffer.

According to some embodiments of the present disclosure, the screen capture process includes obtaining pixel values of rows of the framebuffer. The pixel values may be obtained through framebuffer parameters provided by the system, where the framebuffer parameters comprise pixel values of the rows of the framebuffer. The framebuffer parameters may also include information regarding the framebuffer itself. For example, the framebuffer may provide a function "Ioctl( )" which reads the framebuffer parameters to obtain pixel values of the rows of the framebuffer from the framebuffer parameters.

In step S160, it is determined if the pixel values of the rows of the framebuffer are substantially equivalent to the pixel values of the rows of the display screen. Typically, graphic hardware can function properly in multiple display modes. For example, graphic hardware that supports a 1024×768×24 image mode also typically supports a 800× 600×16 image mode. When the pixel values of the rows of the framebuffer are not substantially equivalent to the pixels values of the rows of the screen, the screenshot process may produce screenshots that are scrambled or corrupt or discolored such that the image of the screen shot does not display the information displayed at the display device, causing the users not able to save the needed information and inconveniences associated with.

In some cases, scrambled screenshots are a result of improperly ordered pixels within the screenshot. The improperly ordered pixels of the screenshot are caused by improper sorting of the row data of the screenshot read from the framebuffer. The sorting of the rows data of the screenshot is based on the pixel values of the rows of the framebuffer. If the pixel values of the rows of the framebuffer are not substantially equivalent to the pixel values of the rows of the screen, the sorting of the pixel values of the rows of the framebuffer and the sorting of the pixel values of the rows of the screen are not the same. This produces improperly ordered pixels within the screenshot. To avoid this issue, embodiment of the present invention provide a screen capture process comprising a step of determining the pixel values of the rows to ensure the pixel values of the rows of the framebuffer are substantially equivalent to the pixel values of the rows of the screen, such that to confirm whether the row arrangement of the image data for the screen capture is the same as the row pixel values of the display screen.

In step S180, if the pixel values of the rows of the framebuffer are not substantially equivalent to the pixel values of the rows of the screen in S170, each row of pixels from the screenshot data read from the framebuffer is processed in accordance with the pixel values of the rows of the screen. The screenshot data comprises image data displayed on the display device when the screen capture command is received.

If the pixel values of the rows of the framebuffer are not substantially equivalent to the pixel values of the rows of the screen, it is determined that the sorting of the pixel values of the rows of the screenshot data read from the framebuffer is not the same as the sorting of the pixel values of the rows of the screen. Each row of pixels from the screenshot data read from the framebuffer is processed in accordance with the pixel values of the rows of the screen. The screenshot data comprises image data displayed on the display device when the screen capture command is received. The determination of the row pixel values, and the processing of the corresponding image data of the screen capture prevents image pixel disorder, image blurring such that it is convenient for the user to save the information displayed at the display device and to increase screen capture efficiency.

If the pixel values of the rows of the framebuffer are substantially equivalent to the pixel values of the rows of the screen, the sorting of the pixel values of the rows of the screenshot data read from the framebuffer is the same as the sorting of the pixel values of the rows of the screen. In this case, processing the screenshot data is not required. A file of a screenshot can be created based on the screenshot data.

Figure 5:
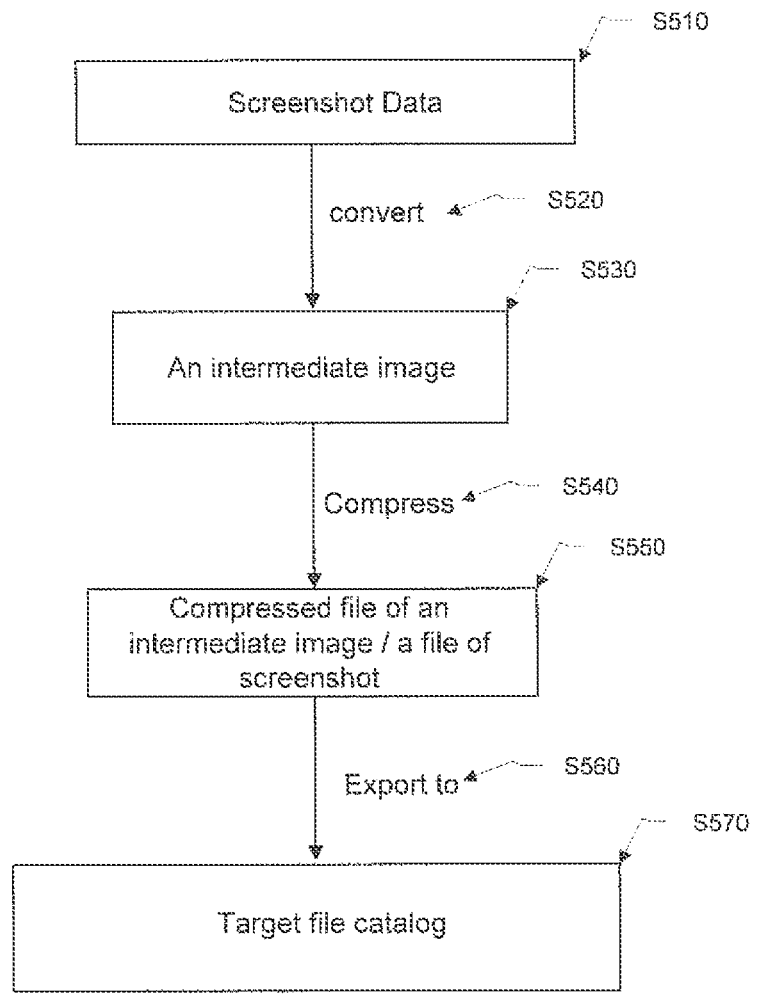
FIG. 5 is a flow chart depicting an exemplary screen capture process for generating an intermediate image according to embodiments of the present disclosure.

In step S190, a file of a screenshot is created based on the screenshot data. FIG. 5 depicts an exemplary process of creating a file comprising a screenshot based on processed screenshot data. In step S520, the screenshot data S510 is converted to create an intermediate image format S530 of the processed screenshot data in accordance with a required format of a compression algorithm. In step S540, a file comprising the intermediate image is compressed using the compression algorithm. In step S560, the file comprising the screenshot is exported to the target file catalog S570. According to some embodiments, the compression algorithm comprises Huffman Coding that satisfies size and quality requirements by the users for the screenshot.

The screen parameters may comprise a distribution order of the RGB channels of the display screen, and the framebuffer parameters may comprise the distribution order of the RGB channels of the framebuffer. According to some embodiments, the screen capture method further comprises determining whether the distribution order of the RGB channels of the framebuffer and the distribution order of the RGB channels of the screen are substantially equivalent.

A default sorting of the distribution order of the RGB channels is from high to low BGR; however, it is possible to use a distribution order for the RGB channels of the framebuffer that is different from the distribution order of the RGB channels of the display screen. When the distribution order of the RGB channels of the framebuffer is different from the distribution order of the RGB channels of the display screen, images of red screen, blue screen, distorted colors, etc. may be produced such that the screen capture does not display the colors displayed at the display device, causing the user not able to save the information displayed by the display device and inconvenience in use.

Problems such as red screen, blue screen, distorted colors in a screen capture may be caused by improperly ordered RGB channels. Improperly ordered RGB channels are typically the result of improperly sorting the distribution order of the RGB channels of a screenshot read from the framebuffer. The sorting of the distribution order of the RGB channels of the screenshot is based on the distribution order of the RGB channels of the framebuffer. If the distribution order of the RGB channels of the framebuffer is not substantially equivalent to the distribution order of the RGB channels of the screen, the RGB value order in the screenshot data will be different from the distribution order of the RGB channels of the display screen, leading to improperly ordered RGB channels in the screenshot. In order to avoid the red and blue screens or distorted colors, embodiments of the present invention determine the distribution order of the RGB channel in order to determine whether the RGB value order of the framebuffer are substantially equivalent to the distribution order of the RGB channels of the screen.

If the distribution order of the RGB channels of the framebuffer is not substantially equivalent to the distribution order of the RGB channels of the display screen, then the RGB value order of the screenshot data read from the framebuffer is the different from the distribution order of the RGB channels of the display screen and adjustment of the RGB value order of the screenshot data in accordance with the distribution order of the RGB channels of the screen. The image data of the screen capture is the image data of the display at the time when the screen capture command received. The determination of the distribution of the RGB channels and the corresponding processing of the image data of the screen capture prevents the RGB channel disorder in the screenshot image, images of distorted colors such as blue screen and red screen such that it is convenient for the user to save the information displayed at the display device and to increase the screen capture efficiency.

If the distribution order of the RGB channels of the framebuffer is substantially equivalent to the distribution order of the RGB channels of the display screen, the RGB value order of the screen shot data is correct and an adjustment is not required. A file comprising a screenshot image can be created directly based on the screenshot data.

Figure 2:
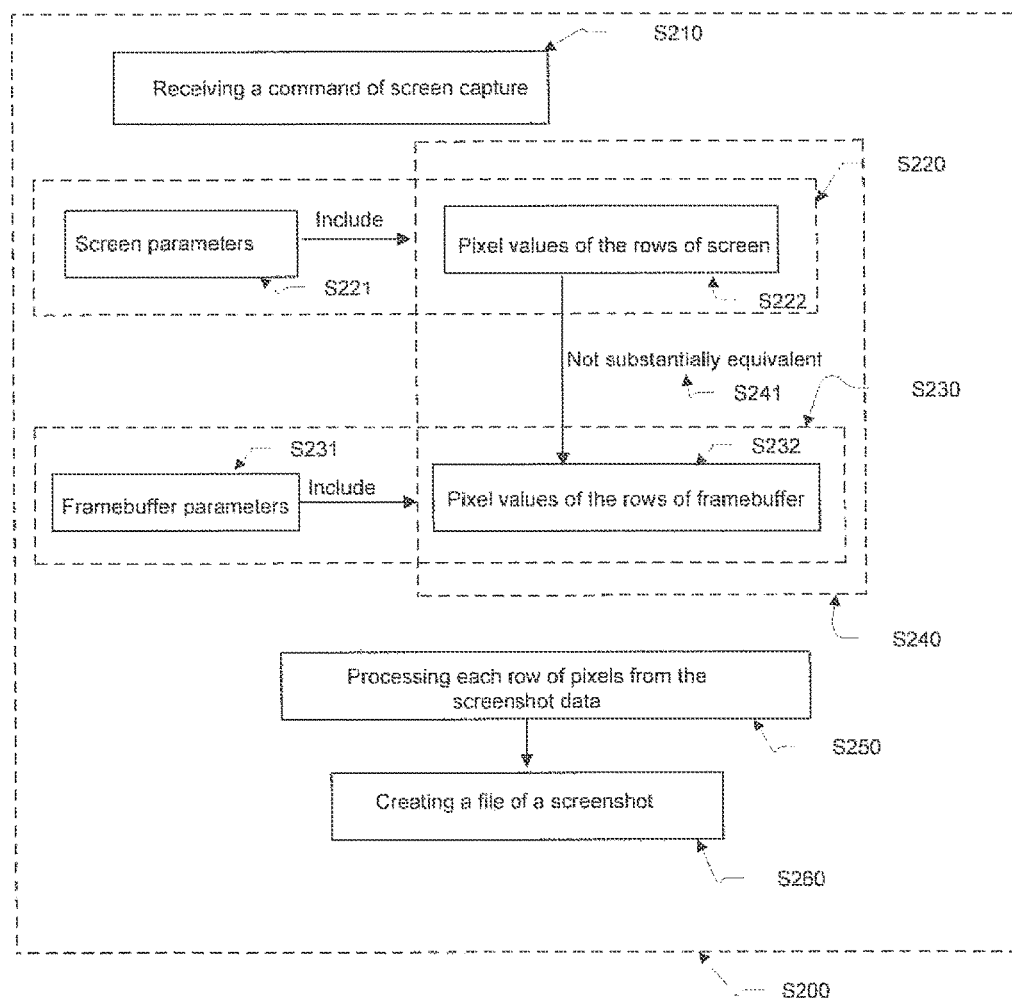
FIG. 2 is a block diagram depicting an exemplary device for performing a screen capture according to embodiments of the present disclosure.

FIG. 2 is a block diagram depicting an exemplary screen capture device according to embodiments of the present invention. The device includes screen capture command receiving module S210 for receiving a screen capture command. A screen parameter capturing module S220 obtains screen parameters S221 containing pixel values S222 of the rows of the screen. A framebuffer parameter obtaining module S230 obtains framebuffer parameters S231 containing pixel values S232 of the rows of the framebuffer. A row pixel value determination module S240 reads the pixel values of the rows of the framebuffer S232 and the pixel values of the rows of the screen S222 and determines in whether the pixel values of the rows of the framebuffer are substantially equivalent to the pixel values of the rows of the screen S241. A screen capture image data analyzing module S250 processes each row of the screenshot data read from the framebuffer based on the pixel values of the rows of the screen if the pixel values of the rows of the framebuffer are not substantially equivalent to the pixel values of the rows of the screen. The screenshot data comprises image data displayed on the screen when the screen capture command is received. A screen capture image file saving module S260 receives processed screenshot data and creates a file comprising the screenshot based on the processed screenshot data. Processors 210-260 may be the same processor or several different processors or processor cores.

The screen parameters may include a distribution order of the RGB channels of the display screen. The framebuffer parameters may include a distribution order of the RGB channels of the framebuffer.

The device also includes an RGB channel determination module for reading a distribution order of the RGB channels of the framebuffer, reading a distribution order of the RGB channels of the display screen, and determining whether the distribution order of the RGB channels of the framebuffer is substantially equivalent to the distribution order of the RGB channels of the display screen. A screen capture image data RGb adjustment module also reads the distribution order of the RGB channels of the screen, adjusts the distribution order of the RGB channels of the screenshot data based on the distribution order of the RGB channels of the screen if the distribution order of the RGB channels of the framebuffer is not substantially equivalent to the distribution order of the RGB channels of the screen.

A file comprising a screenshot is created based on the processed screenshot data. The process includes converting a format of the processed screenshot data in accordance with the required format of a compression algorithm and creating a file comprising an intermediate image. The process further includes compressing the file comprising the intermediate image in accordance with the compression algorithm. The compressed file comprising the intermediate image contains the screenshot. According to some embodiments, the compression algorithm is a Huffman Coding algorithm.

Pixel values of rows of the screen are obtained from screen parameters. This step includes obtaining screen parameters comprising a screen resolution, and then obtaining pixel values of rows of the screen based on the screen resolution.

Figure 3:
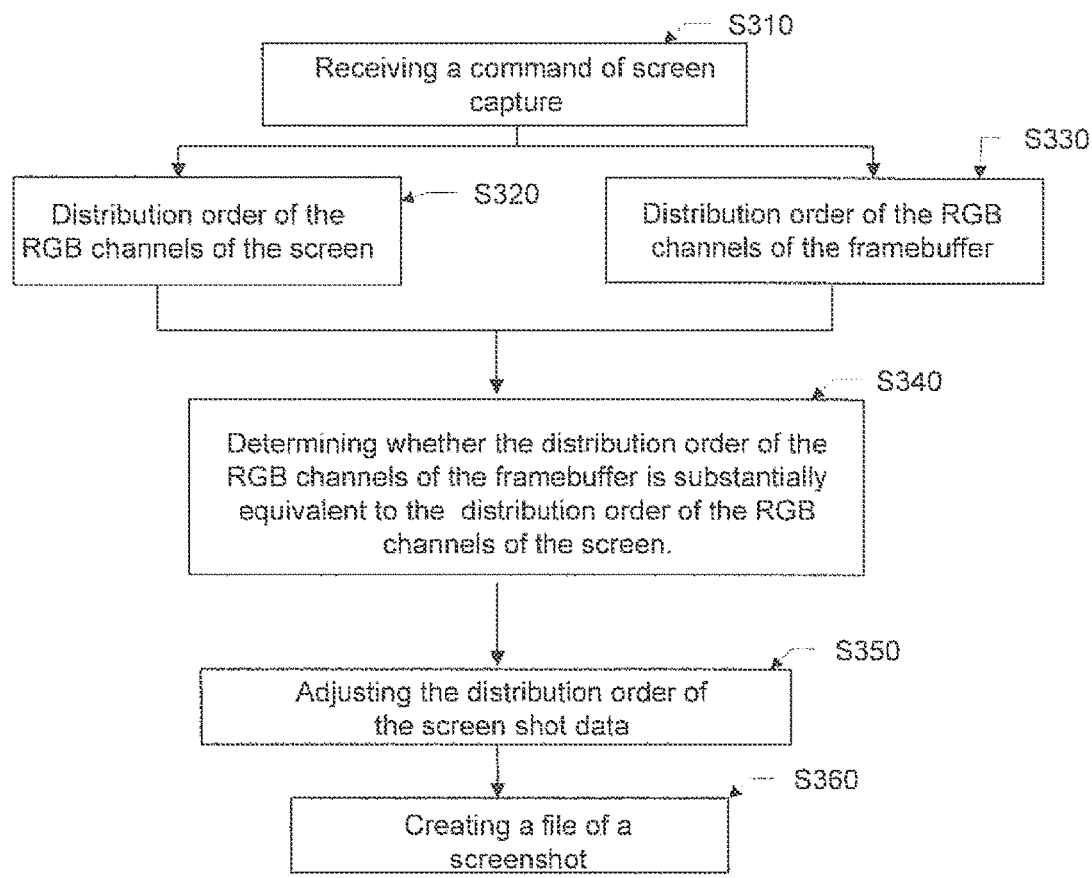
FIG. 3 is a flow chart depicting an exemplary screen capture process according to embodiments of the present disclosure.

FIG. 3 is a flowchart depicting an exemplary sequence of computer implemented steps for generating a screen capture according to embodiments of the present invention.

In step S310, a screen capture command is received. The screen capture command causes the system to capture a screenshot of an image displayed on a display device. There are multiple ways of inputting the screen capture command. According to some embodiments, a user presses a physical button on the device to initiate a screen capture. The buttons may be one physical button or a combination of several physical buttons. According to other embodiments, a user may press a screenshot button on a touch-sensitive display interface to initiate the screenshot capture. In still other embodiments, a user may initiate the screen capture by shaking the device or performing another predefined gesture or action for purposes of saving the displayed information the user intend to.

In step S320, a distribution order of the RGB channels of the display screen is obtained. The screen parameters may include screen resolution, distribution order of the RGB channels, pixel ratio, screen aspect ratios and brightness of the screen, and so on. A system can adjust the screen parameters to set a display mode of the display device. The distribution order of the RGB channels of the screen needs to be obtained to determine whether the distribution order of the RGB channels of the framebuffer and the distribution order of the RGB channels of the screen are substantially equivalent and to subsequently process the distribution order of the RGB channels of the screenshot data based on the distribution order of the RGB channels of the screen. The distribution order of the RGB channels of the screen may be obtained using a system function for reading screen parameters.

In step S330, framebuffer parameters comprising a distribution order of the RGB channels of the framebuffer are obtained. Upon the receipt of the pixel values of the rows of the screen in step S320, in order to determine whether the distribution order of the RGB channels of the screen is substantially equivalent to the distribution order of the RGB channels of the framebuffer, the distribution order of the RGB channels of the framebuffer is determined. The distribution order of the RGB channels of the framebuffer is obtained from the parameters of the framebuffer, which is obtained first. The parameters of the framebuffer include related information for the framebuffer device, one of which is the distribution order of the RGB channels. Therefore, after obtaining the parameters of the framebuffer, the distribution order of the RGB channels can be obtained.

According to some embodiments, the framebuffer provides a function, such as "Ioctl( )", which reads the distribution order of the RGB channels of the framebuffer. In this way, the distribution order of the RGB channels of the framebuffer can be obtained using the function of "Ioctl( )" from the framebuffer.

In step S340, it is determined if the distribution order of the RGB channels of the framebuffer is substantially equivalent to the distribution order of the RGB channels of the screen.

A distribution order of the RGB channels may progress from high to low BGR by default; however, the distribution order of the RGB channels of the framebuffer may be different from the distribution order of the RGB channels of the screen. When the distribution order of the RGB channels of the framebuffer is different from the distribution order of the RGB channels of the screen, images of red screen, blue screen, distorted colors, etc. may be produced such that the screen capture does not display the colors displayed at the display device, causing the user not able to save the information displayed by the display device and inconvenience in use.

Problems such as red screen, blue screen, distorted colors in a screen capture image are caused by improperly ordered RGB. Improperly ordered RGB channels can be caused by improperly sorting the distribution order of the RGB channels of a screenshot read from the framebuffer. The sorting of the distribution order of the RGB channels of the screenshot is sorted according to the distribution order of the RGB channels of the framebuffer. If the distribution order of the RGB channels of the framebuffer is not substantially equivalent to the distribution order of the RGB channels of the screen, the distribution order of the RGB channels of the screenshot data will be different from the distribution order of the RGB channels of the screen, which leads to improperly ordered RGB channels in the screenshot. In order to avoid the problem of images of distorted color, e.g., red screens, blue screens, etc., the distribution order of the RGB channels is obtained to determine whether the distribution order of the RGB channels of the framebuffer is substantially equivalent to the distribution order of the RGB channels of the screen such that it is determined whether the image data of the screen capture's RGB value ordering is substantially the same as the distribution order of the RGB channels of the display device If the distribution order of the RGB channels of the framebuffer is not substantially equivalent to the distribution order of the RGB channels of the screen, the RGB value order of the screenshot data read from the framebuffer is not substantially equivalent to the distribution order of the RGB channels of the screen. The RGB value order of the screenshot data is adjusted based on the distribution order of the RGB channels of the screen to avoid improperly ordered RGB channels and to further avoid the distortion of red and blue colors in the image. The image data of the screen capture is the image data displayed by the display device at the time when the screen capture command is received. The determination of the distribution orders of the screen capture image and the display, and the processing of the corresponding image data of the screen capture prevents image RGB channel disorder, image blurring such that it is convenient for the user to save the information displayed at the display device and to increase screen capture efficiency.

If the distribution order of the RGB channels of the framebuffer is substantially equivalent to the distribution order of the RGB channels of the screen, the RGB value order of the screenshot data read from the framebuffer is correct, and the adjustment is not required for the RGB value order. A file of a screenshot can be created directly according to the screenshot data.

In step S360, a file comprising a screenshot is created according to the processed screenshot data. Screenshot data is converted to an intermediate image format comprising the processed screenshot data in accordance with a format required by a compression algorithm. The file comprising the intermediate image is compressed in accordance with the compression algorithm. The compressed file comprising the intermediate image is a screenshot. Finally, the file comprising the screenshot can be exported to a target file catalog. According to some embodiments, the compression algorithm is a Huffman Coding that satisfies size and quality requirements of the screenshot.

Figure 4:
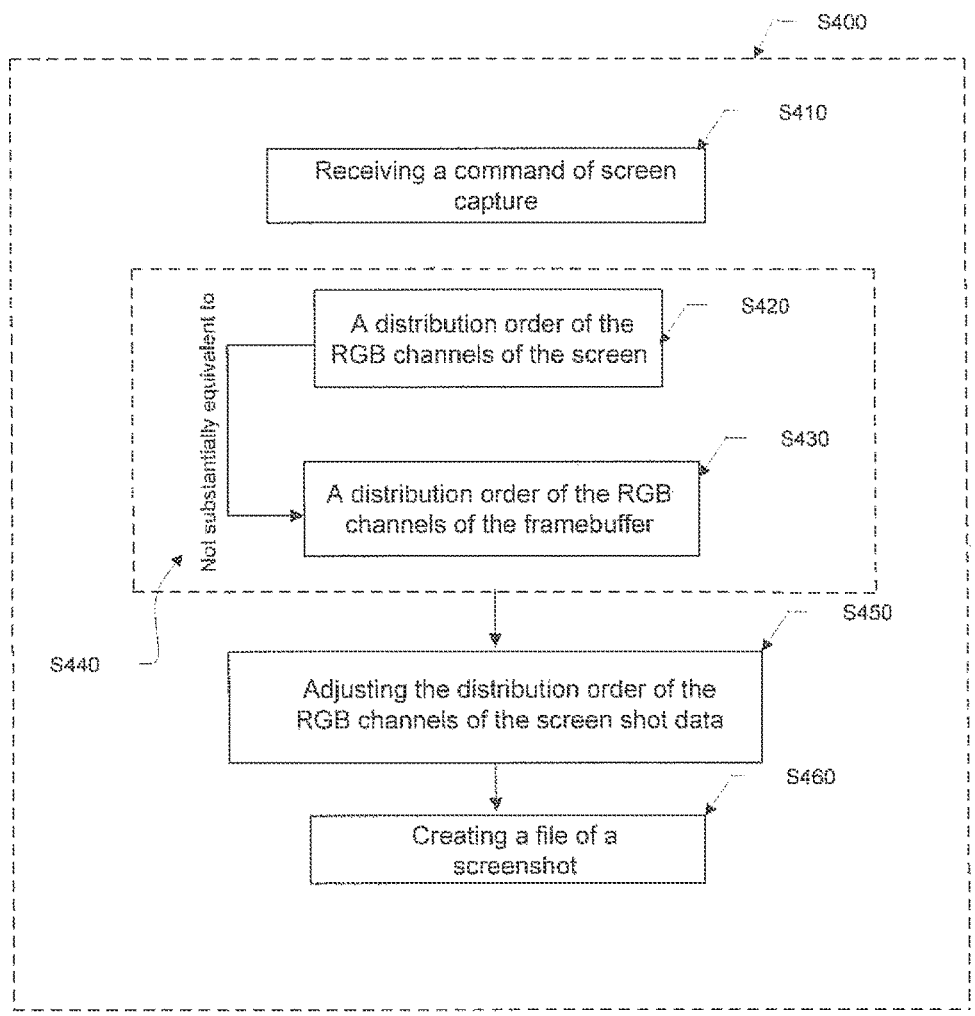
FIG. 4 is a block diagram depicting a device for capturing image data from a framebuffer according to embodiments of the present disclosure.

FIG. 4 depicts an exemplary device for performing a screen capture according to embodiments of the present invention. The device includes a screen capture command receiving module S410 for receiving a screen capture command. A screen RGB channel distribution ordering module S420 obtains a distribution order of the RGB channels of the screen. A framebuffer parameter obtaining module S430 obtains framebuffer parameters comprising a distribution order of the RGB channels of the framebuffer. A RGB channel determination module S440 reads the distribution order of the RGB channels of the framebuffer provided by S430, reads the distribution order of the RGB channels of the screen provided by S420, and determines whether the distribution order of the RGB channels of the framebuffer is substantially equivalent to the distribution order of the RGB channels of the screen. The RGB value order of the screenshot data is then adjusted using screen capture image data RGB adjustment module S450 in accordance with the distribution order of the RGB channels of the screen if the distribution order of the RGB channels of the framebuffer is not substantially equivalent to the distribution order of the RGB channels of the screen. The screenshot data comprises image data displayed on the screen upon receipt of the screen capture command. The device includes a screen capture file saving module S460 for receiving the adjusted screenshot data and creating a file comprising the screenshot in accordance with the screenshot data.

According to the present disclosure, the readable mediums do not include transitory media, such as the modulate data signals and carrier signals. The readable mediums disclosed include but are not limited to phase-change memory (PRAM), static random-access memory (SRAM), dynamic random-access memory (DRAM), other types of the random-access memory (RAM), read-only memory (ROM), electrically erasable programmable read-only memory (EEPROM), flash RAM and other memory technologies, compact disc read-only memory (CD-ROM), digital video disc (DVD) and other optical storage, magnetic tape, magnetic disc and other magnetic storage and any other non-transitory media.

What is claimed is:

1. A method of capturing a screen image, the method comprising:
   taking an initial screenshot of a frame buffer in response to a screen capture command,
      the frame buffer having a plurality of rows, a row of the frame buffer having a plurality of pixels, each pixel having a pixel value,
      the initial screenshot having a number of rows, a row of the initial screenshot having a number of pixels, the screenshot capturing the pixel value for each pixel in the row of the frame buffer;
   determining a number of pixels in a row of a display device;
   determining a number of pixels in the row of the frame buffer;
   determining whether the number of pixels in the row of the display device is substantially equivalent to the number of pixels in the row of the frame buffer; and
   changing the number of pixels in the row of the initial screenshot to be substantially equivalent to the number of pixels in the row of the display device to form a modified screenshot when the number of pixels in the row of the display device is not substantially equivalent to the number of pixels in the row of the frame buffer.

2. A method for creating a screen capture of an image rendered on a display device, comprising:
   receiving a screen capture command;
   obtaining screen parameters of the display device, the screen parameters including a distribution order of RGB channels of the display device;
   determining pixel values of rows of the display device based on the screen parameters;
   obtaining framebuffer parameters from a framebuffer of the display device, the framebuffer parameters comprising pixel values of rows of the framebuffer;
   determining whether pixel values of the rows of the framebuffer are substantially equivalent to the pixel values of the rows of the display device;
   processing screenshot data read from the framebuffer based on the pixel values of the rows of the screen when the pixel values of the rows of the framebuffer are not substantially equivalent to the pixel values of the rows of the screen, wherein the screenshot data comprises image data associated with the image displayed on the display device when the screen capture command is received; and
   creating a file comprising the screenshot.

3. The method of claim 2, wherein the framebuffer parameters comprise a distribution order of RGB channels of the framebuffer.

4. The method of claim 3, further comprising:
   determining whether the distribution order of the RGB channels of the display device is substantially equal to the distribution order of the RGB channels of the framebuffer; and
   when the distribution order of RGB channels of the display device is different from the distribution order of RGB channels of the framebuffer, adjusting the distribution order of the RGB channels of the framebuffer in accordance with the distribution order of the RGB channels of the display device.

5. A method of capturing a screen image, the method comprising:
   taking an initial screenshot of a frame buffer in response to a screen capture command, the initial screenshot including a value of each pixel in each row of the frame buffer;
   obtaining a screen resolution of a display device;
   determining a number of pixels in each row of the display device based on the screen resolution of the display device;
   obtaining a number of pixels in each row of the frame buffer;
   determining whether the number of pixels in each row of the display device is substantially equivalent to the number of pixels in each row of the frame buffer;
   changing the number of pixels in each row of the initial screenshot of the frame buffer to be substantially equivalent to the number of pixels in each row of the display device to form a modified screenshot when the number of pixels in each row of the display device is not substantially equivalent to the number of pixels in each row of the frame buffer;
   determining a distribution order of RGB channels of the display device;
   determining a distribution order of RGB channels of the frame buffer;
   determining whether the distribution order of RGB channels of the display device is substantially equal to the distribution order of RGB channels of the frame buffer; and
   changing the distribution order of RGB channels of the modified screenshot of the frame buffer to match the distribution order of RGB channels of the display device to form a changed screenshot when the distribution order of RGB channels of the display device is different from the distribution order of RGB channels of the frame buffer.

6. A method of capturing a screen image, the method comprising:
   taking an initial screenshot of a frame buffer in response to a screen capture command, the initial screenshot including a value of each pixel in each row of the frame buffer;
   obtaining a screen resolution of a display device;
   determining a number of pixels in each row of the display device based on the screen resolution of the display device;
   obtaining a number of pixels in each row of the frame buffer;
   determining whether the number of pixels in each row of the display device is substantially equivalent to the number of pixels in each row of the frame buffer;
   changing the number of pixels in each row of the initial screenshot of the frame buffer to be substantially equivalent to the number of pixels in each row of the display device to form a modified screenshot when the number of pixels in each row of the display device is not substantially equivalent to the number of pixels in each row of the frame buffer;
   determining a distribution order of RGB channels of the display device;

determining a distribution order of RGB channels of the frame buffer;

determining whether the distribution order of RGB channels of the display device is substantially equal to the distribution order of RGB channels of the frame buffer; and changing the distribution order of RGB channels of the initial screenshot of the frame buffer to match the distribution order of RGB channels of the display device to form a changed screenshot when the number of pixels in each row of the display device is substantially equivalent to the number of pixels in each row of the frame buffer, and the distribution order of RGB channels of the display device is different from the distribution order of RGB channels of the frame buffer.

7. The method of claim 6, further comprising:
creating a screenshot file of the modified screenshot;
compressing the screenshot file using a compression algorithm to form a compressed file, the compressed file including modified screenshot data; and
exporting the compressed file to a target file catalog.

8. The method of claim 7, wherein the compression algorithm is a Huffman coding algorithm.

9. A method for creating a screen capture of an image rendered on a display device, comprising:
receiving a screen capture command;
obtaining screen parameters of the display device, the screen parameters including a screen resolution and the pixel values of rows of the display device are determined based on the screen resolution;
determining pixel values of rows of the display device based on the screen parameters;
obtaining framebuffer parameters from a framebuffer of the display device, the framebuffer parameters comprising pixel values of rows of the framebuffer;
determining whether pixel values of the rows of the framebuffer are substantially equivalent to the pixel values of the rows of the display device;
processing screenshot data read from the framebuffer based on the pixel values of the rows of the screen when the pixel values of the rows of the framebuffer are not substantially equivalent to the pixel values of the rows of the screen, wherein the screenshot data comprises image data associated with the image displayed on the display device when the screen capture command is received;
creating a first file comprising the screenshot;
converting the processed screenshot data to a different format in accordance with a format required by a compression algorithm to create an intermediate image, the compression algorithm being a Huffman coding algorithm;
creating a second file comprising the intermediate image; and
compressing the second file using the compression algorithm, wherein the compressed file comprises the screenshot data.

10. An apparatus for capturing a screen image, the apparatus comprising:
a display screen to display image data;
a frame buffer to store the image data to be presented on the display screen; and
a processer coupled to the display screen and the frame buffer, the processor to:
take an initial screenshot of the frame buffer in response to a screen capture command,
the frame buffer having a plurality of rows, a row of the frame buffer having a plurality of pixels, each pixel having a pixel value,
the initial screenshot having a number of rows, a row of the initial screenshot having a number of pixels, the screenshot capturing the pixel value for each pixel in the row of the frame buffer;
determine a number of pixels in a row of the display screen;
determine a number of pixels in the row of the frame buffer;
determine if the number of pixels in the row of the display screen is substantially equivalent to the number of pixels in the row of the frame buffer; and
change the number of pixels in the row of the initial screenshot to be substantially equivalent to the number of pixels in the row of the display screen to form a modified screenshot when the number of pixels in the row of the display screen is not substantially equivalent to the number of pixels in the row of the frame buffer.

11. An apparatus for creating a screen capture of a rendered image, comprising:
a display screen configured to display image data;
a framebuffer configured to store the image data to be presented on the display screen; and
a processor coupled to the display screen and the framebuffer that:
receives a screen capture command,
obtains screen parameters comprising pixel values of rows of the display screen and a distribution order of RGB channels of the display device,
obtains framebuffer parameters comprising pixel values of rows of the framebuffer and a distribution order of RGB channels of the framebuffer,
reads the pixel values of the rows of the framebuffer provided by the processor,
reads pixel values of the rows of the screen provided by the processor,
determines if the pixel values of the rows of the framebuffer are substantially equivalent to the pixel values of the rows of the screen, and
processes the image data from the framebuffer based on the pixel values of the rows of the display screen when the pixel values of rows of the framebuffer are not substantially equivalent to the pixel values of rows of the screen, wherein the image data comprises the rendered image displayed on the display device when the screen capture command is received.

12. The apparatus of claim 11, wherein the processor reads the distribution order of the RGB channels of the framebuffer, reads the distribution order of the RGB channels of the screen, determines if the distribution order of the RGB channels of the framebuffer are substantially equivalent to the distribution order of the RGB channels of the display device, and adjusts the distribution order of the RGB channels of the framebuffer in accordance with the distribution order of the RGB channels of the screen when the distribution order of the RGB channels of the framebuffer is not substantially equivalent to the distribution order of the RGB channels of the screen.

13. An apparatus for capturing a screen image, the apparatus comprising:
a display screen to display image data;
a frame buffer to store the image data to be presented on the display screen; and a processor coupled to the display screen and the frame buffer, the processor to:
    take an initial screenshot of the frame buffer in response to a screen capture command, the initial screenshot including a value of each pixel in each row of the frame buffer;
    determine a screen resolution of the display screen;
    determine a number of pixels in each row of the display screen based on the screen resolution of the display screen;
    determine a number of pixels in each row of the frame buffer;
    determine if the number of pixels in each row of the display screen is substantially equivalent to the number of pixels in each row of the frame buffer;
    change the number of pixels in each row of the initial screenshot of the frame buffer to be substantially equivalent to the number of pixels in each row of the display screen to form a modified screenshot when the number of pixels in each row of the display screen is not substantially equivalent to the number of pixels in each row of the frame buffer;
    determine a distribution order of RGB channels of the display screen;
    determine a distribution order of RGB channels of the frame buffer;
    determine whether the distribution order of RGB channels of the display screen is substantially equal to the distribution order of RGB channels of the frame buffer; and
    change the distribution order of RGB channels of the modified screenshot of the frame buffer to match the distribution order of RGB channels of the display screen to form a changed screenshot when the distribution order of RGB channels of the display screen is different from the distribution order of RGB channels of the frame buffer.

14. The apparatus of claim 13, wherein the processor to further:
    determine a distribution order of RGB channels of the display screen;
    determine a distribution order of RGB channels of the frame buffer;
    determine whether the distribution order of RGB channels of the display screen is substantially equal to the distribution order of RGB channels of the frame buffer; and
    change the distribution order of RGB channels of the initial screenshot of the frame buffer to match the distribution order of RGB channels of the display screen to form a changed screenshot when the number of pixels in each row of the display screen is substantially equivalent to the number of pixels in each row of the frame buffer, and the distribution order of RGB channels of the display screen is different from the distribution order of RGB channels of the frame buffer.

15. The apparatus of claim 14, wherein the processor to create a screenshot file from the modified screenshot, and compress the screenshot file using a compression algorithm to form a compressed file, the compressed file including the image data.

16. The apparatus of claim 15, wherein the compression algorithm comprises a Huffman coding algorithm.

17. An apparatus for creating a screen capture of a rendered image, comprising:
    a display screen configured to display image data;
    a framebuffer configured to store the image data to be presented on the display screen; and
    a processor coupled to the display screen and the framebuffer that:
        receives a screen capture command,
        obtains screen parameters comprising pixel values of rows of the display screen,
        obtains framebuffer parameters comprising pixel values of rows of the framebuffer,
        reads the pixel values of the rows of the framebuffer provided by the processor,
        reads pixel values of the rows of the screen provided by the processor,
        determines if the pixel values of the rows of the framebuffer are substantially equivalent to the pixel values of the rows of the screen,
        processes the image data from the framebuffer based on the pixel values of the rows of the display screen when the pixel values of rows of the framebuffer are not substantially equivalent to the pixel values of rows of the screen, wherein the image data comprises the rendered image displayed on the display screen when the screen capture command is received,
        creates a file comprising the screenshot in accordance with the processed image data,
        converts a format of the processed image data in accordance with a required format of a compression algorithm to create an intermediate image;
        creates a second file comprising the intermediate image, wherein the processor compresses the second file using the compression algorithm, wherein the compressed file comprises the image data, wherein the compression algorithm comprises a Huffman coding algorithm;
        obtains screen parameters, wherein the screen parameters comprise a screen resolution; and
        determines the pixel values of the rows of the screen based on the screen resolution.

18. A method for performing a screen capture of a display device, comprising:
    receiving a screen capture command;
    obtaining a distribution order of RGB channels of the display device;
    obtaining framebuffer parameters comprising a distribution order of RGB channels of a framebuffer;
    determining whether the distribution order of the RGB channels of the framebuffer is substantially equivalent to the distribution order of the RGB channels of the display device;
    adjusting RGB value order of screenshot data read from the framebuffer based on the distribution order of the RGB channels of the display device when the distribution order of the RGB channels of the framebuffer is not substantially equivalent to the distribution order of the RGB channels of the display device, wherein the screenshot data comprises image data displayed the display device when the screen capture command is received; and
    creating a file comprising the adjusted screenshot data.

19. A non-transitory computer-readable medium having computer-readable instructions stored thereon to be executed by a computer, the instructions including a method comprising:

taking an initial screenshot of a frame buffer in response to a screen capture command, the initial screenshot including a value of each pixel in each row of the frame buffer;

determining a distribution order of RGB channels of a display device to display image data;

determining a distribution order of RGB channels of the frame buffer;

determining whether the distribution order of RGB channels of the display device is substantially equal to the distribution order of RGB channels of the frame buffer; and changing the distribution order of RGB channels of the initial screenshot of the frame buffer to match the distribution order of RGB channels of the display device to form a modified screenshot when the distribution order of the RGB channels of the frame buffer is different from the distribution order of the RGB channels of the display device.

20. An apparatus for performing a screen capture of a display device, comprising:

a display device configured to display image data;

a framebuffer configured to store image data; and a processor coupled to the display device and the framebuffer that receives a screen capture command, the processor:

obtains a distribution order of RGB channels of the display device, obtains framebuffer parameters comprising a distribution order of RGB channels of the framebuffer, determines if the distribution order of the RGB channels of the framebuffer is substantially equivalent to the distribution order of the RGB channels of the screen, adjusts RGB value order of the image data of the framebuffer in accordance with the distribution order of the RGB channels of the screen when the distribution order of the RGB channels of the framebuffer is not substantially equivalent to the distribution order of the RGB channels of the screen, stores the adjusted image data comprising an image displayed on the display device when the screen capture command is received, and creates a file comprising the adjusted image data.

* * * * *